UNITED STATES PATENT OFFICE.

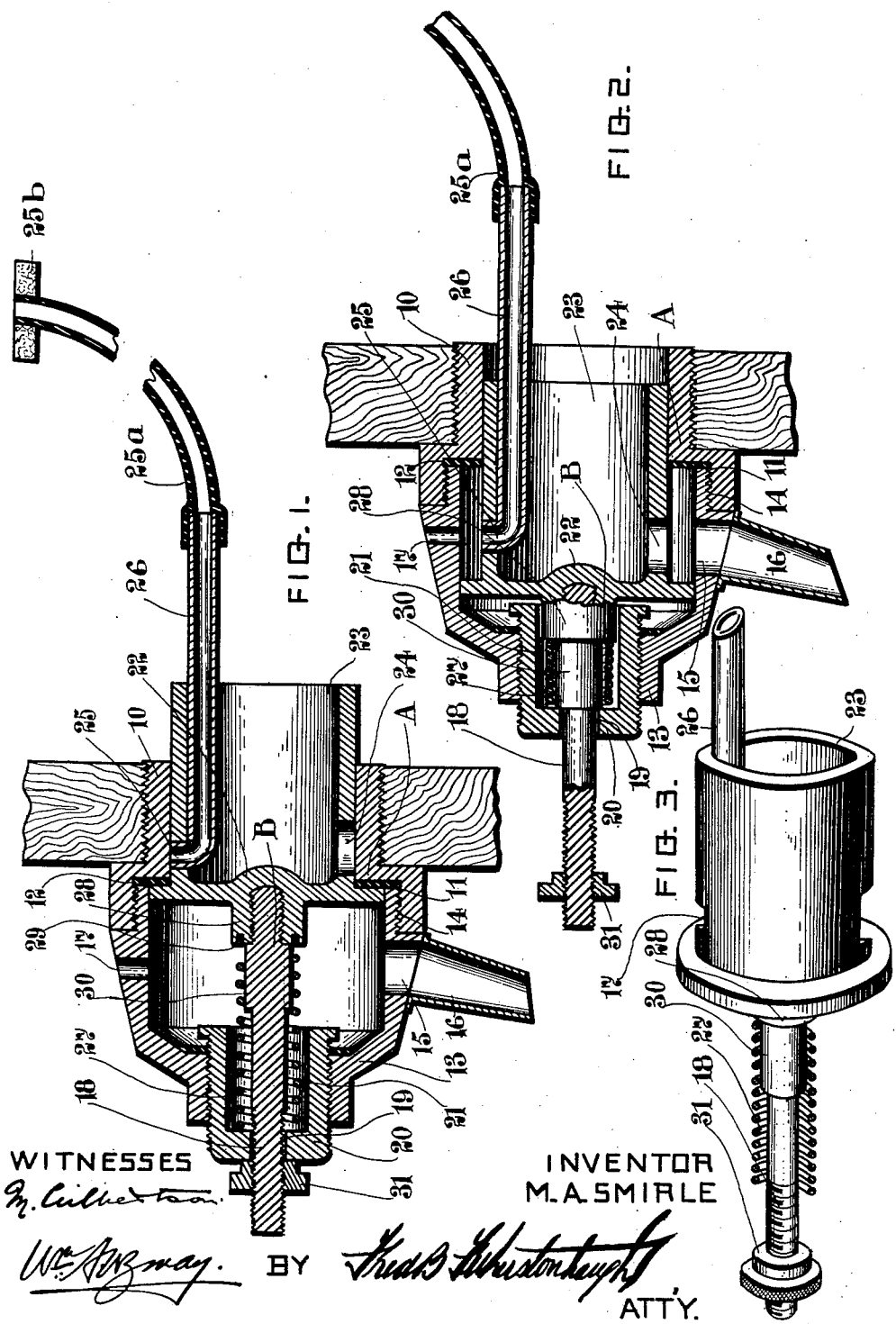

MATHEW ANDREW SMIRLE, OF FINCH, ONTARIO, CANADA.

SPIGOT.

1,054,146.  Specification of Letters Patent.  Patented Feb. 25, 1913.

Application filed November 15, 1911. Serial No. 660,359.

*To all whom it may concern:*

Be it known that I, MATHEW ANDREW SMIRLE, a subject of the King of Great Britain, and resident of Finch, in the Province of Ontario, Dominion of Canada, have invented certain new and useful Improvements in Spigots, of which the following is a specification.

My invention relates to improvements in spigots or valves of the type adapted to be applied to any kind of liquid containing receptacles such as oil or gasolene tanks, barrels, beer kegs or similar receptacles and the objects of my invention are to provide for the admission of air through the valve as the liquid is being withdrawn, thereby facilitating the flow of liquid, to provide for a quick cut off of the fluid, to provide for the adjustment in the amount of opening of the valve and for locking the valve against opening; and it consists essentially of the improved construction and arrangement of parts hereinafter described in detail in the accompanying specification and drawings in which—

Figure 1 is a vertical sectional view of the valve in closed position. Fig. 2 is a vertical sectional view of the same in open position. Fig. 3 is a perspective view of the movable valve element.

Referring now to the drawings: A represents the sleeve member of the valve adapted to be fitted to the receptacle, the outlet of which is to be controlled, and in the embodiment illustrated the sleeve member comprises a screw threaded neck 10 and an enlarged screw threaded recess 11 in which may be located a washer or other packing element 12. The remaining portion 13 of the valve sleeve is provided with a screw threaded neck 14 which threads into said recess 11, and is also furnished with a delivering port 15 and spout 16 and also an air port 17.

According to my invention the valve stem B of the device comprises a sliding rod 18 which reciprocates in the bore 19 of a threaded member or closure 20, said member or closure being provided with and being of suitable size to screw recess 21 into the outer portion 13 of the valve sleeve. The stem B of the valve is provided with a valve element 22 which works in the recess 11 and bears against the washer 12 when the valve is in closed position.

In carrying out my invention I construct the valve with a sliding sleeve or tubular member 23 which reciprocates within the threaded neck 10 and in which are located the delivery port 24 and the air port 25 adapted to register with the ports 15 and 17 respectively when the valve is in open position. In order to obtain a ready flow of liquid a pipe 26 is provided, which forms a connection between the air port 25 and the interior of the tank. The valve element 22 of the device is normally held in closed position, that is against the washer 12 by means of spiral spring 27 which abuts against the bottom of the recess 21 and bears against the collar 28 in which is located an annular recess 29 adapted to receive the end of said spring and in order to limit the outward movement of the stem B a stop 30 is provided thereon, which abuts against the bottom of the recess 21 when the stem B is in its outermost position. A threaded nut 31 or other manually operated means may be employed to pull the valve stem B and valve outwardly into open position, and in the embodiment shown said nut 31 is threaded on the rod 18.

The operation is the device is as follows: In order to open the valve the stem B is pulled outwardly by rotating the thumb nut 31 until the delivery port 24 registers with the port 15 and the air port registers with the port 17, thus the liquid is allowed to flow from the tank under an atmospheric air pressure and from the construction of the device it is evident that the flow of liquid may be readily regulated by adjustment of the ports 24 and 15 relative to each other and also that a continuous flow of liquid may be obtained by locking the stem B in open position by means of the thumb nut 31. The pressure of the valve element 22 on its seat and therefore the liquid tight effectiveness of the valve may be obtained by increasing the tension of the spring 27. It will also be seen that the valve may be locked against opening by merely rotating the said member or closure 20 until the stop 30 rests against the bottom of the recess 21 while if an immediate flow of liquid is desired the stem B may be merely pulled outwardly without rotating the nut 31.

As many changes could be made in the above construction and many apparently widely different embodiments of my invention, within the scope of the claims, constructed without departing from the spirit or scope thereof, it is intended that all matter contained in the accompanying specification and drawings, shall be interpreted as illustrative and not in a limiting sense. To provide for free venting on the interior of the tank in heavy liquids the inner end of pipe 25 may be provided with a flexible tube 25ª, the end of which is adapted to be held above the surface of the liquid by a float 25ᵇ.

What I claim as my invention is:

1. In combination a tank, a spigot comprising a reciprocating valve provided with a tubular member provided with a fluid delivery port and an air port, a pipe connecting said air port to the interior of the tank, a sleeve member supporting said valve, and provided with an air port and a delivery port adapted to register with the air port and delivery port respectively of the tubular member upon the reciprocation of said tubular member.

2. In combination a receptacle, a spigot comprising a reciprocating tubular member through which the liquid is adapted to flow, and a valve element on said tubular member, a sleeve member supporting said tubular member and provided with a valve seat for said valve element, means for normally holding the valve element in closed position and means for admitting air into the receptacle during the flow of the liquid.

3. In combination a receptacle, a spigot comprising a reciprocating tubular member provided with a fluid delivery port, a sleeve member supporting said tubular member and provided with a fluid delivery port adapted to register with the port of said tubular member, a spring held valve element on the tubular member adapted to control the passage of fluid through both delivery ports, means for admitting air into the receptacle during the passage of fluid and means for controlling the movement of the valve element.

4. In combination a receptacle, a spigot comprising a reciprocating tubular member adapted to permit the flow of fluid therethrough, a sleeve member supporting said tubular member and provided with a valve seat, packing means located in the valve seat, a member or closure threaded in said sleeve member, a valve stem adapted to extend through said member or closure, a spring held valve element mounted on the stem and connected to the tubular member and adapted to normally rest in the valve seat and means for admitting air into the receptacle during the passage of fluid.

5. In combination a receptacle, a spigot comprising a reciprocating tubular member provided with an air port and a fluid delivery port, a pipe connecting the air port to the interior of the receptacle, a sleeve member supporting the tubular member inserted into the receptacle, a body portion threaded into the sleeve member and provided with an air port and a fluid delivery port adapted to register respectively with the air port and delivery port of the tubular member respectively, a member or closure provided with a recess threaded into the body portion, a stem adapted to slide in said member or closure, a valve element on said tubular member secured to the stem and a spring seated in said recess and bearing against said valve element to normally close the passage through the ports, means for limiting the outward movement of the stem and adjustable threaded means for operating said stem.

6. In combination a receptacle, a spigot comprising a sleeve member inserted into the receptacle, and provided with an air port and a delivery port, a tubular member reciprocably mounted within said sleeve member and provided with an air port and a delivery port, means for reciprocating said tubular member within said sleeve whereby the respective air ports and delivery ports of said tubular member and said sleeve member are brought into register, and means for locking said tubular member in any adjusted position.

In witness whereof I have hereunto set my hand in the presence of two witnesses.

MATHEW ANDREW SMIRLE.

Witnesses:
RUSSEL S. SMART,
M. CULBERTSON.